US012423364B2

(12) United States Patent
Gonsalves et al.

(10) Patent No.: US 12,423,364 B2
(45) Date of Patent: Sep. 23, 2025

(54) USING ARTIFICIAL INTELLIGENCE AND MACHINE LEARNING TO RECOMMEND SUPPORTING MATERIAL FOR MEDIA PROJECTS

(71) Applicant: Avid Technology, Inc., Burlington, MA (US)

(72) Inventors: Robert Gonsalves, Wellesley, MA (US); Shailendra Mathur, Beaconsfield (CA)

( * ) Notice: Subject to any disclaimer, the term of this patent is extended or adjusted under 35 U.S.C. 154(b) by 327 days.

(21) Appl. No.: 18/365,046

(22) Filed: Aug. 3, 2023

(65) Prior Publication Data

US 2025/0045336 A1  Feb. 6, 2025

(51) Int. Cl.
*G06F 17/00* (2019.01)
*G06F 16/953* (2019.01)
*G06F 40/166* (2020.01)
*G06F 40/30* (2020.01)

(52) U.S. Cl.
CPC .......... *G06F 16/953* (2019.01); *G06F 40/166* (2020.01); *G06F 40/30* (2020.01)

(58) Field of Classification Search
CPC .. G06F 16/953; G06F 16/3329; G06F 40/166; G06F 40/30
See application file for complete search history.

(56) References Cited

U.S. PATENT DOCUMENTS 11,061,986 B2 * 7/2021 Castillo ................... G06F 16/58
11,604,798 B2 * 3/2023 Ghoshal .................. G06F 18/24
11,841,897 B2 * 12/2023 Pancha ................ G06F 16/3347
11,977,845 B2 * 5/2024 Lyske .................... G06F 16/583
11,989,507 B2 * 5/2024 Tunstall-Pedoe ....... G06F 40/56
12,105,755 B1 * 10/2024 Omar ..................... G06N 3/045

(Continued)

FOREIGN PATENT DOCUMENTS

WO   WO-2024161331 A1 *  8/2024  ............. G06V 20/49
WO   WO-2024194689 A1 *  9/2024  ........... G06V 10/764

OTHER PUBLICATIONS

Chang, Shih-Fu, et al, "Next-Generation Content Representation, Creation, and Searching for New-Media Applications in Education ", Proceedings of the IEEE (vol. 86, Issue: 5, 1998, pp. 884-904), May 1, 1998 (Year: 1998).*

(Continued)

*Primary Examiner* — Laurie A Ries

(57) ABSTRACT

A large language model (LLM) is used to broaden a search for supporting material for a media project. The LLM is provided with contextual material from the media project and optional grounding material and generates a list of types of supporting material. The list is provided to a machine-learning-based encoder, which encodes the list items into embedding space vectors. A body of source material, which may multimodal, is also encoded into the embedding space. A search engine is used to locate items of source material having embedded space vectors closest to vectors corresponding to the list of types of supporting material. Located items are provided to a media editing application as suggested supporting material. The body of source material may include live external sources. A small language model fine-tuned with a training data set generated by a LLM may be used instead of the LLM.

22 Claims, 7 Drawing Sheets

(56) References Cited

U.S. PATENT DOCUMENTS

| | | | | |
|---|---|---|---|---|
| 12,169,512 | B2* | 12/2024 | Hamilton | G06F 16/3334 |
| 12,259,938 | B2* | 3/2025 | DeVos | G06F 16/9558 |
| 2024/0303711 | A1* | 9/2024 | Tan | G06Q 30/0635 |
| 2024/0311407 | A1* | 9/2024 | Barron | G06F 16/3344 |
| 2024/0362286 | A1* | 10/2024 | He | G06F 16/93 |
| 2024/0362398 | A1* | 10/2024 | Bilgen | G06F 40/106 |
| 2024/0370478 | A1* | 11/2024 | Twig | G06F 16/3344 |
| 2024/0403341 | A1* | 12/2024 | Berglund | G06F 16/3326 |
| 2024/0419710 | A1* | 12/2024 | Matson | G06F 16/3329 |
| 2025/0053586 | A1* | 2/2025 | Nelson | G06F 40/289 |

OTHER PUBLICATIONS

Golubev, Yaroslav, et al, "So Much in So Little: Creating Lightweight Embeddings of Python Libraries", Arxiv ID: 2209.03507, Sep. 7, 2022, pp. 1-11. (Year: 2022).*

Breiman, L., "Random forests," Oct. 2001, DOI:10.1023/A:1010950718922.

Castle, E. "The benefits of vector search—and 5 reasons IT leaders need it to improve search experiences," Nov. 14, 2022.

Cherti, M. et al., "Reproducible scaling laws for contrastive language-image learning," Dec. 14, 2022, arXiv:2212.07143v1.

Girdhar, R. et al., "IMAGEBIND: One Embedding Space To Bind Them All," May 31, 2023, arXiv:2305.05665v2.

Huang, X. et al., "Question answering using Retrieval Augmented Generation with foundation models in Amazon SageMaker JumpStart," May 2, 2023.

Lewis, P. et al. "Retrieval-Augmented Generation for Knowledge-Intensive NLP Tasks," Apr. 12, 2021, arXiv:2005.11401.

Mikolov, T. et al., "Efficient Estimation of Word Representations in Vector Space," Sep. 7, 2013, arXiv:1301.3781v3.

Quinlan. J.R., "Induction of decision trees," Mar. 25, 1986, DOI:10.1007/BF00116251.

Radford, A. et al., "Learning Transferable Visual Models From Natural Language Supervision," Feb. 26, 2021, arXiv:2103.00020v1.

Reimers, N. et al., "Sentence-BERT: Sentence Embeddings using Siamese BERT-Networks," Aug. 2019, arXiv:1908.10084v1.

Rygl, J., "Semantic Vector Encoding and Similarity Search Using Fulltext Search Engines," Jun. 3, 2017, DOI:10.18653/v1/W17-2611.

Salton, G., Buckley, C., "Term-weighting Approaches in Automatic Text Retrieval," Jan. 1988, DOI:10.1016/0306-4573(88)90021-0.

Schmidhuber, J., "Deep Learning in Neural Networks: An Overview," Jan. 2015, DOI:10.1016/j.neunet.2014.09.003.

Jon Stokes, "The CHAT Stack, GPT-4, And The Near-Term Future Of Software", jonstokes.com, Mar. 15, 2023, https://www.jonstokes.com/p/the-chat-stack-gpt-4-and-the-near.

Jon Stokes, "Here's How Generative AI Can Fix The News", jonstokes.com, Jun. 15, 2023, https://www.jonstokes.com/p/heres-how-generative-ai-can-fix-the.

* cited by examiner

FIG. 5

USING ARTIFICIAL INTELLIGENCE AND MACHINE LEARNING TO RECOMMEND SUPPORTING MATERIAL FOR MEDIA PROJECTS

BACKGROUND

When media editors develop a document or media production on a given topic or content area, they rely on reference materials to provide background information. Background information may be sourced from existing media or document repositories associated with the production or from a range of other sources, such as material that can be found via an Internet search or on social media. When the document or media production is a news story, the editors often have tight deadlines and therefore need to work rapidly and efficiently. Meeting such deadlines can be challenging since there is often a vast amount of information available, which makes it difficult to locate and narrow down the search quickly to focus on resources that are the most pertinent for the task at hand. The problem can be especially acute when editors have to search for semantically related material, as the breadth and scope of available information based on a search query may encompass subject matter that is of limited or no relevance.

There is therefore a need to assist editors and researchers in focusing their searches so as to increase the likelihood that they locate relevant and useful material in an efficient manner.

SUMMARY

Material from a media project in progress is provided to a large language model that is used to recommend types of supporting material for the project. Machine learning encoders encode both the recommended material types and a body of source material as vectors in an embedding space, and a search engine returns source material items whose embeddings are closest to embeddings of a recommended material type.

In general, in one aspect, a method of locating material in support of a media project comprises: directing a prompt to a large language model (LLM), wherein the prompt includes: one or more items of content pertaining to the media project; and a request to provide a list of types of material that support the media project; receiving output from the LLM, the LLM output comprising a list of types of material that support the media project; inputting the LLM output to a first machine-learning-based encoder to generate a first set of embeddings that include, for each type of supporting material specified in the LLM output, a corresponding vector in an embedding space; providing a body of source material to a second machine-learning-based encoder to generate a second set of embeddings comprising, for each item of source material in the body of source material, a corresponding vector in the embedding space; using a search engine to identify a plurality of vectors of the second set of embeddings having a greatest degree of similarity in the embedding space with at least one vector of the first set of embeddings and; outputting from the search engine a plurality of items of the source material, each item of the plurality of items of the source material corresponding to the one of the identified plurality of vectors of the second set of embeddings.

Various embodiments include one or more of the following features. The content pertaining to the media project has been incorporated into the media project. The prompt includes grounding material comprising material that was not included within data used to train the LLM. The list of types of material that support the media project output by the LLM includes a plurality of media modalities. The one or more items of content pertaining to the media project included within the prompt includes a non-text media modality. Enabling a user of a media editing system used to create the media project to edit the LLM output and inputting to the first machine-learning-based encoder LLM output edited by the user. The body of source material includes a plurality of media modalities. The second machine-learning-based encoder is able to encode a plurality of media modalities into a common embedding space. The body of source material includes material obtained from sources external to a media editing system used to create the media project. The sources external to the media editing system are dynamic. The dynamic sources include at least one of a social media feed, external search engines, and WikiData. A description of a content item in an external source is retrieved and encoded to generate a corresponding vector in the embedding space, and, when the content item is requested for use with the media project, a locator associated with the vector is used to retrieve the content item from the external source. The material obtained from sources external to the media editing system is curated and stored in a storage location that is local to the media editing system, the curation including selection of material based on at least one of a date of release of the material, a current presence of the material in an external source, and a size of the material. The degree of similarity in the embedding space is one of a cosine similarity metric and a Pythagorean distance metric. The prompt is automatically directed to the large language model when a location of a position indicator within a media editing application used to create the media project is changed. Displaying within a user interface of a media editing application used to create the media project one or more items of the plurality of items of the source material output by the search engine. Displaying within a user interface of a media editing application used to create the media project the output of the LLM. Directing a second prompt to the LLM, the second prompt including the LLM output and a request to specify actual instances of potential source material items of the types listed in the LLM output.

In general, in another aspect, a method of locating material in support of a media project, comprises: directing a prompt to a small language model (SLM), wherein: the SLM has been trained using a data set comprising a plurality of news stories and, for each news story in the plurality of news stories, a corresponding large language model (LLM) output of a list of types of material that would support a media project pertaining to the news story; and the prompt includes: one or more items of content pertaining to the media project; and a request to provide a list of types of material that support the media project; receiving output from the SLM, the SLM output comprising a list of types of material that support the media project; inputting the SLM output to a first machine-learning-based encoder to generate a first set of embeddings that include, for each type of supporting material specified in the SLM output, a corresponding vector in an embedding space; providing a body of source material to a second machine-learning-based encoder to generate a second set of embeddings comprising, for each item of source material in the body of source material, a corresponding vector in the embedding space; using a search engine to identify a plurality of vectors of the second set of embeddings having a greatest degree of similarity in the embedding space with at least one vector of the first set of embeddings and; outputting from the search engine a plurality of items of the source material, each item of the plurality of items of the source material corresponding to the one of the identified plurality of vectors of the second set of embeddings.

In various embodiments the SLM and a media editing application used by an editor to edit the media project are hosted on a system local to the editor.

In general, in a further aspect, a computer program product comprises: a non-transitory computer-readable medium with computer-readable instructions encoded thereon, wherein the computer-readable instructions, when processed by a processing device, instruct the processing device to perform a method of locating material in support of a media project, the method comprising: directing a prompt to a large language model (LLM), wherein the prompt includes: one or more items of content pertaining to the media project; and a request to provide a list of types of material that support the media project; receiving output from the LLM, the LLM output comprising a list of types of material that support the media project; inputting the LLM output to a first machine-learning-based encoder to generate a first set of embeddings that include, for each type of supporting material specified in the LLM output, a corresponding vector in an embedding space; providing a body of source material to a second machine-learning-based encoder to generate a second set of embeddings comprising, for each item of source material in the body of source material, a corresponding vector in the embedding space; using a search engine to identify a plurality of vectors of the second set of embeddings having a greatest degree of similarity in the embedding space with at least one vector of the first set of embeddings and; outputting from the search engine a plurality of items of the source material, each item of the plurality of items of the source material corresponding to the one of the identified plurality of vectors of the second set of embeddings.

In general, in another aspect, a system comprises: a memory for storing computer-readable instructions; and a processor connected to the memory, wherein the processor, when executing the computer-readable instructions, causes the system to perform a method of locating material in support of a media project, the method comprising: directing a prompt to a large language model (LLM), wherein the prompt includes: one or more items of content pertaining to the media project; and a request to provide a list of types of material that support the media project; receiving output from the LLM, the LLM output comprising a list of types of material that support the media project; inputting the LLM output to a first machine-learning-based encoder to generate a first set of embeddings that include, for each type of supporting material specified in the LLM output, a corresponding vector in an embedding space; providing a body of source material to a second machine-learning-based encoder to generate a second set of embeddings comprising, for each item of source material in the body of source material, a corresponding vector in the embedding space; using a search engine to identify a plurality of vectors of the second set of embeddings having a greatest degree of similarity in the embedding space with at least one vector of the first set of embeddings and; outputting from the search engine a plurality of items of the source material, each item of the plurality of items of the source material corresponding to the one of the identified plurality of vectors of the second set of embeddings.

BRIEF DESCRIPTION OF THE DRAWINGS

FIG. 5 is the diagrammatic screenshot of FIG. 4 in which a user has edited the listing of supporting document types output by the large language model.

DETAILED DESCRIPTION

Figure 1:
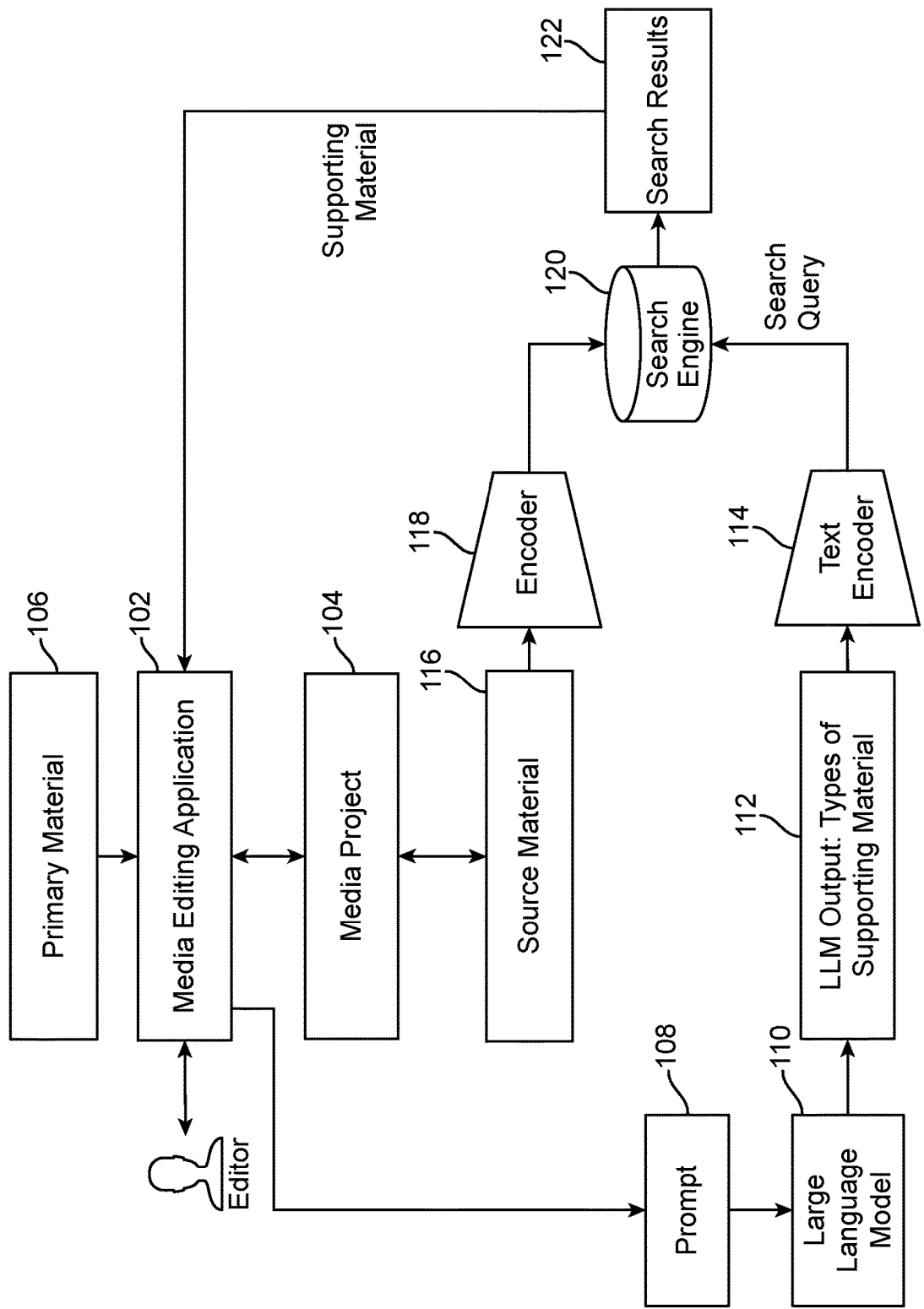
FIG. 1 is a high-level block diagram showing the use of a large language model to search for supporting material for a media project.

When searching for material that supports a media project, editors have the ability to access large and heterogenous sources of information. The sources may include text documents, audio, and video that have already been compiled for the media project and that are stored in media asset management systems. When working on news-related media projects, the source material may be changing rapidly to keep up with current events. Here, editors may wish to draw upon various live feeds and social media.

When attempting to locate suitable material, editors fall back on their current knowledge to frame their search terms. This may inadvertently result in a search that returns results that miss out material that would be of interest, especially contextual material that lacks a direct connection to the entered key words or search terms, or if the search terms are in a different language than the indexed content. For example, when working on a story about inflation, an unaided editor might search for supporting material about consumer spending but omit searching for material more broadly related to the current state of the economy.

Conversely, search results may spuriously emphasize results that contain character strings similar to those in the search text but that are irrelevant to the purpose of the search. For example, an extracted keyword, "inflation," from the headline "Inflation Rise is a Disaster for the Market" might bring up video clips that show inflation of automobile tires or beachballs instead of clips related to economic inflation. Or the extracted keyword, "turkey," from the headline "Turkey Involved in International Diplomacy," might bring up video clips of the bird turkey, turkey farms, or cooking turkey, instead of the country Turkey.

We describe herein methods of improving the variety, scope, and relevance of searches for supporting material for a media project. As used herein, a media project refers to a composition that includes one or more of, text, audio, still imagery, graphics, and video. The media project may be stored in a proprietary or interoperable format within a media editing application. The project includes the composition itself, which is a data structure specifying the sequence, related metadata like scripts, and relationships between the various media elements that contribute to the media project. In addition, the project includes a set of folders or bins that contain metadata and pointers to media assets that have been assembled and made available to the project editor as potential content for the composition.

While the described methods may be used with any media project, they are likely to be especially useful for unscripted content, i.e., media content that is not specified initially by a transcript, since for scripted content, reference and background material is usually determined when the transcript is generated. Unscripted content includes non-fiction media, such as news stories and documentaries, and reality television, which is often referred to as unscripted entertainment.

The described methods involve the use of large language models (LLMs) and machine-learning-based encoders—both text encoders and encoders for other modalities, such as imagery, graphics, audio, and video. The latter may be implemented by different encoders for each modality or by a single multimodal encoder.

Referring to FIG. 1, the process starts with media editing application 102 that is being used by an editor to create media project 104. The application may be a non-linear editing application, a newsroom management system, a digital audio workstation, or another media editing application. Examples of such applications are Media Composer®, Avid iNEWS®, and Pro Tools® respectively, which are all products of Avid Technology, Inc., Burlington, Massachusetts. During creation of media project 104, the editor has access to a range of primary material 106 pertaining to the media project that is used as the principal content of the media composition. For a news story, the primary material may be video from an onsite news crew or a press release. Any material that has already been included in media project 104 is also primary material. For example, for a news story, the primary material would include a headline and the text of the news story, as well as any still images, graphics, audio, or video that has been edited into the media project so far. In addition to the use of primary material, editors often wish to include supporting material within the media project. Such supporting material can serve a number of purposes, such as providing context or background on a topic, character, or location. One example of such supporting material in the video domain is B-roll footage. Another example in the text domain is social media text content that provides supporting material to a story being written.

In the case where the editor is creating media to cover a news story, it may be the receipt of a specific item that triggers the initiation of the media project. The item may be a news story, an assignment with a description of a topic that is being sent to a journalist, journalist notes from the field, or trending social media feeds. Using the example above, the content item may be a news story about inflation. The content item may be purely textual in form, or may include other modalities, such as images, graphics, audio, and video.

We now describe the generation of suggestions for material that supports the media project. When the editor wishes to obtain suggestions for supporting material, prompt 108 is generated and provided as input to large language model 110. In the described implementation, media editing application 102 generates the prompt, either in response to the editor's request for supporting material, or automatically as it tracks the progress of the editor through the project editing, for example by monitoring the temporal location of the position indicator, i.e., the play-head. New prompts may be generated whenever a new story or assignment is received at the media editing application, or a dispatch from a news reporter in the field, a social media posting, or a wire or news agency story is received.

The prompt includes one or more of the following three parts: grounding material, contextual material, and a request. The grounding material serves to provide the LLM with material that was not included within the training data set used to train the LLM. Examples of such material include recent material that became available after the model training was completed. Thus, for example, if the training ended a year before the present, the LLM would lack information that only became available within the past year. The grounding material supplies relevant current information to update the model. Such grounding material may include Twitter and newswire (e.g., Reuters, API) feeds spanning the period between the date of LLM training completion and the present day. Other kinds of grounding material may include information that is not available on the internet and material that is not made publicly accessible, such as confidential information or material that is normally provided only for paying customers, or in the archive system of an enterprise. The nature of the grounding material is unconstrained and does not typically include any of the primary material that is to be included within the media project. In some cases, however, suitable grounding material may be drawn from the corpus of source material that is searched for supporting material, as described below.

Contextual material is included in the prompt to help ensure the relevance of the LLM responses. This is usually taken from an item of primary material 106. If an item of primary material is short enough, the entire item may be used for context. For primary material that is too long, i.e., that would cause the token limit of the LLM to be exceeded, the media editing application selects a portion, e.g., by using a headline, abstract, or portions that have the most relevance to the current stage of media project editing. In the latter case, the media editing application tracks the editor's progress with the media project in progress and may select a portion from a temporal region of the media project in progress surrounding the editor's current focus. This focus location may be inferred from the position indicator, which functions as a play-head and is displayed as a bar within a timeline display of the media project in progress. The selected portion of content may then comprise primary media or text of that portion of the media composition in progress. In various implementations, the user proceeds with the contextual material suggested by the system. In other implementations, the user specifies the primary content item to be used and performs the selection to be provided as context for the LLM. Alternatively, the editor may review and edit the contextual material generated by the media editing application before it is passed to the LLM. In the example described above, the content item may be a news story about inflation or an image of price labels for consumer products in a supermarket or an audio clip of a news story announcing the latest inflation figures.

The third part of prompt 108 is a natural language request that specifies what the LLM is being asked for. In the described implementation, the request asks for the types of materials and key words that would support the media project in progress. The request may include more specific guidance, requesting, for example, the types of tweets or newswire feeds that would provide effective supporting material. When the media project in progress is a news story, additional visual elements, such as infographics, charts, or maps may be requested. The editor's request may also include one or more of the following: a period of history that is relevant; significant individuals having a connection to the subject at hand; a geographical region where relevant events have taken place or where the subject matter at hand is likely to have an impact; and publications or publishers, or social media sources likely to have produced material on the subject at hand. In addition, the request may include one or more constraints, such as a date range, originating geographical region, media modality (text, imagery, graphics, audio, video), and whether the recommended material is free or comes with a fee or usage restrictions.

The grounding material and the sampled content may include text or one or more other modalities, such as still imagery, graphics, audio, and video. The overall length of the prompt (i.e., grounding material, sampled content, and request) together with the length of the LLM output is limited by the LLM model. For example, a version of GPT-4, a LLM available from OpenAI of San Francisco, California, supports a total of 8,000 tokens, equivalent to about 6,000 words, for the combined input and output. In one partition of the tokens between input and output, the input size is limited to 5,000 words, leaving about 1,000 words for the output response.

In response to prompt 108, LLM 110 generates LLM output 112. Continuing with the example of a story about inflation, the request to the LLM may be "List three types of B-roll footage for a news story with the headline, 'Inflation Rise is a Disaster for the Market,' and show keywords for finding video clips." An illustrative response would be:
1. Financial District Street View
   a. Keywords: Wall Street, financial district, busy street, stock exchange exterior.
2. Stock Market Footage
   a. Keywords: Stock market, traders, stock exchange, tickers, trading floor, market charts, rising prices.
3. Consumer Spending
   a. Keywords: Shopping, retail stores, groceries, high prices, cash register, credit card transaction, crowded market.

In this example, the output of the LLM consists of text, however the text may describe types of media that include text, images, graphics, audio and video. The output of the LLM is then used to search a corpus of source material to generate search results, as described below.

The use of the LLM serves to broaden the search in a semantically coherent manner. When such a broader set of search terms are used with a search engine, the range and depth of supporting material contain a richer variety as compared with a direct entry of a user's search terms into the search engine. In addition, the use of the LLM together with the grounding material and context causes spurious material (e.g., inappropriate string matching as discussed above) to be excluded from the eventual search results as such material has very different semantic connotations from the desired types of supporting material. The LLM has been trained on a large quantity of material, which gives it facts about the world. It is able to make use of this knowledge to help the user by recommending material that is pertinent to the media project in progress.

LLM output 112 is used as a query to search a corpus of source material for the requested supporting material. In various implementations, LLM output 112 is provided directly to the searching process without further involvement of the user. In other implementations the output is visible to the user, who may choose to edit it, for example by selecting a subset for entry to the encoder, modifying a suggestion provided by the LLM output, or by adding additional supporting material types or key words.

LLM output 112, as optionally edited by the user, is provided to machine-learning-based encoder 114, such as those based on neural networks, decision trees, support vector machines, and random forests. Neural networks are described in Schmidhuber, J. "Deep Learning in Neural Networks: An Overview," DOI: 10.1016/j.neunet.2014.09.003, January 2015; decision trees are described in Quinlan, J., "Induction of Decision Trees," DOI: 10.1007/BF00116251, 25 Mar. 1986; support vector machines are described in Vapnik, V., "Estimation of Dependencies Based on Empirical Data," ISBN: 0387907335, 1979; and random forests are described in Breiman, L., "Random Forests," DOI: 10.1023/A: 1010950718922, October 2001. The encoder converts LLM output 112 into vectors in a multimodal embedding space, with each item in a list of suggested supporting material types being encoded as a vector. A multimodal embedding space is a high-dimensional vector space where diverse types of data, such as images and text, are represented in a unified manner. Synonyms for multimodal embedding spaces include "semantic vector spaces" and "latent spaces." Herein, such spaces are referred to as embedding spaces. Methods for encoding natural language text into an embedding space vector are described in "Efficient Estimation of Word Representations in Vector Space" by Mikolov, T. et al., arXiv: 1301.3781v3 [cs.CL] 7 Sep. 2013. An example of a publicly available semantic text encoder model is CLIP (Contrastive Language-Image Pretraining), available from OpenAI. Given a batch of N (image, text) pairs, CLIP is trained to predict which of the N×N possible (image, text) pairings across a batch actually occurred. To do this, CLIP learns a multi-modal embedding space by jointly training an image encoder and text encoder to maximize the cosine similarity of the image and text embeddings of the N real pairs in the batch while minimizing the cosine similarity of the embeddings of the N2-N incorrect pairings. CLIP is described in Radford, A. et al., arXiv: 2103.00020v1 [cs.CV] 26 Feb. 2021. Other examples of text encoders are described in Cherti, M et al., arXiv: 2212.07143v1 [cs.LG] 14 Dec. 2022, and Reimers, N., et al., DOI: 10.18653/v1/D19-1410, August 2019. The references cited in this paragraph are wholly incorporated herein by reference.

The search for supporting material is performed with respect to corpus of source material 116. The source material may have previously been assembled into an archive by a media company or form part of a media library. Examples of source material that may be incorporated into the corpus to be searched include: the contents of a production or media asset management system associated with the project or created by a media publisher or broadcaster; material available on the internet; photo and video databases and archives; social media; and live news feeds and other live sources. The source material may also include video footage shot by a production company, licensed material from a stock footage firm, or material from a public resource such as footage of government proceedings. Source material 116 may also be accessed and incorporated into the media project in progress by the editor irrespective of the searching process and whether it is selected for inclusion within the search results.

The source material may include one or more of text documents, still imagery, graphics, video, and audio. Other modalities may also be available for searching, such as spatial modalities (e.g., augmented reality, virtual reality), or holographic media. The user may be able to specify what kind of media modalities are to be searched. This may depend on what is available, as well as on the format and type of media project that is being created. An example of a joint embedding for multiple modalities, including images, text, and audio is described in Girdhar et al., arXiv: 2305.05665v2 [cs.CV] 31 May 2023, which is wholly incorporated herein by reference.

Prior to the searching, source material 116 is assembled into a database. Each source material item in the database has an index (i.e., an identifier) that enables it to be associated with its corresponding vector in embedding space. For non-text modalities, various forms of conversion may need to be performed since semantic encoders require fixed formats as inputs. For example, the CLIP image encoder takes in 240×240 RBG images, and the Contrastive Language-Audio Pretraining (CLAP) model requires 16 kHz mono samples of audio for its input. In certain use cases, the available source material may include voluminous quantities of media that have been amassed over an extended period of time into media archives. This is especially true of large media companies, such as national broadcasters and television networks. Media asset storage and management systems store descriptive metadata for each of the stored items. Rather than supply the media itself to a media encoder, the metadata may be provided to a text encoder. This provides sufficient content to enable contextual searching for the corresponding media.

Figure 2:
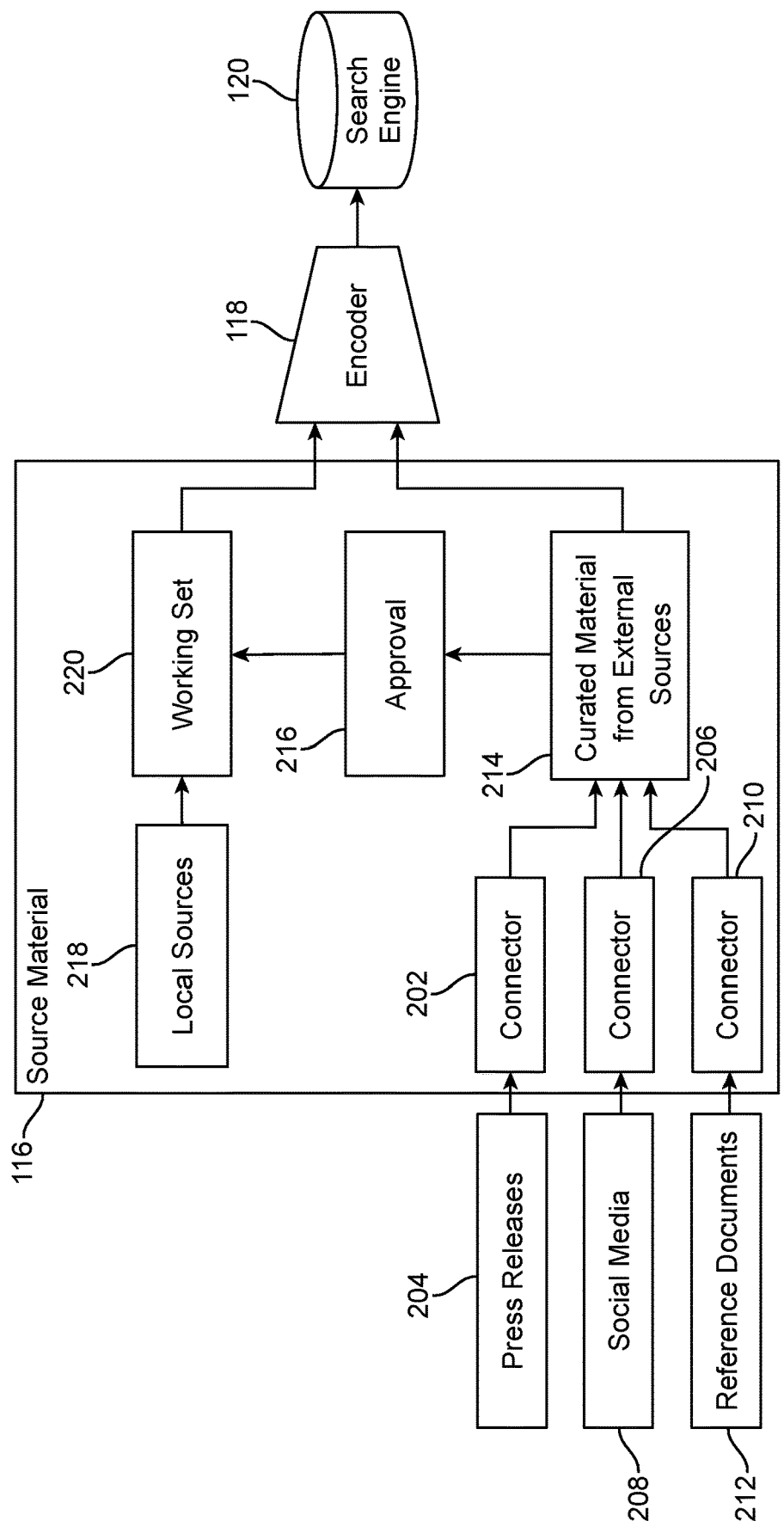
FIG. 2 is a high-level block diagram showing the incorporation of external sources and local sources into a corpus of source material to be searched for supporting material for a media project.

In order to make certain source types accessible to the corpus of source material, especially data sources external to the asset database already associated with the media project within a media or production asset management system, connectors specific to each source type may be required. Such connectors receive data from a source and present them in a format that may be encoded by encoder 118 into a vector in embedding space. For each data source type, a corresponding connector understands the schema of the source such that it is able to locate the appropriate fields, e.g., a "description" field, and present it to the encoder. For example, with a news story input to a news editing application such as Avid iNEWS, the connector includes logic that locates and extracts the written story elements from iNEWS. FIG. 2 shows how source material 116 may include material from external sources as well as local sources. The figure illustrates the use of such external source connectors, with connector 202 adapted to the conversion of press releases 204, connector 206 for current messages on social media (e.g., tweets, Facebook postings, Wikidata) 208, and connector 210 for reference documents 212. Connectors may be implemented as plug-in software modules.

The material received from external data sources is retained in repository 214, which is curated in accordance with various rules. Certain rules may restrict the material to a range of publication dates, specify a maximum size of an item, and require that stored material remain valid. Valid items may be traced back and retrieved from their sources, whereas invalid items may have been deleted. Certain items may be kept as pointers to the external source, and retrieved only if they are incorporated into the media project. The user may specify curation rules, optionally adjusting them to the nature of the media composition. For example, a media project about a fast-changing news item may benefit from supporting material published within the past few days or hours, whereas a historical overview may be supported by material going back years, decades, or centuries. The curation rules serve to maintain the liveness and validity of the repository without requiring the retention of the enormous volumes of material from the external sources. Curation rules may be implemented by the media editing application, with the rules specified by the editor or set automatically by the media editing application in response to the nature of the external sources, the constraints of the system hosting the media editing application, and the nature of the media project being worked on. External source repository 214 may enable an editor to continue working even when their connection to the internet, and hence to the external data sources, is limited or absent. Items from the repository may be passed through encoder 118 and their embeddings stored in the search engine database even if the corresponding original external source item has not been retained in the repository. If such items are found in the search for supporting material and selected for inclusion within the media project, the original item may be retrieved from the source via its identifier, as described in more detail below. Since material received from external sources may be encumbered with fees, broadcast restrictions, or other usage constraints, approval 216 from a person authorized to make such decisions may be required before an externally sourced item can be used in the media project.

Local sources 218 also form a part of source material 116. Such material may be stored on various storage devices local to the media editing application or in remote servers accessible via a data connection. Examples of such sources include media asset management systems and production asset management systems. A selection of local source material that has been selected by the editor is placed into working set 220, which forms a data set of source material readily accessible by the media editing application. In various media editing systems, the working set appears in one or more special-purpose bins within the media editing application.

Figure 3:
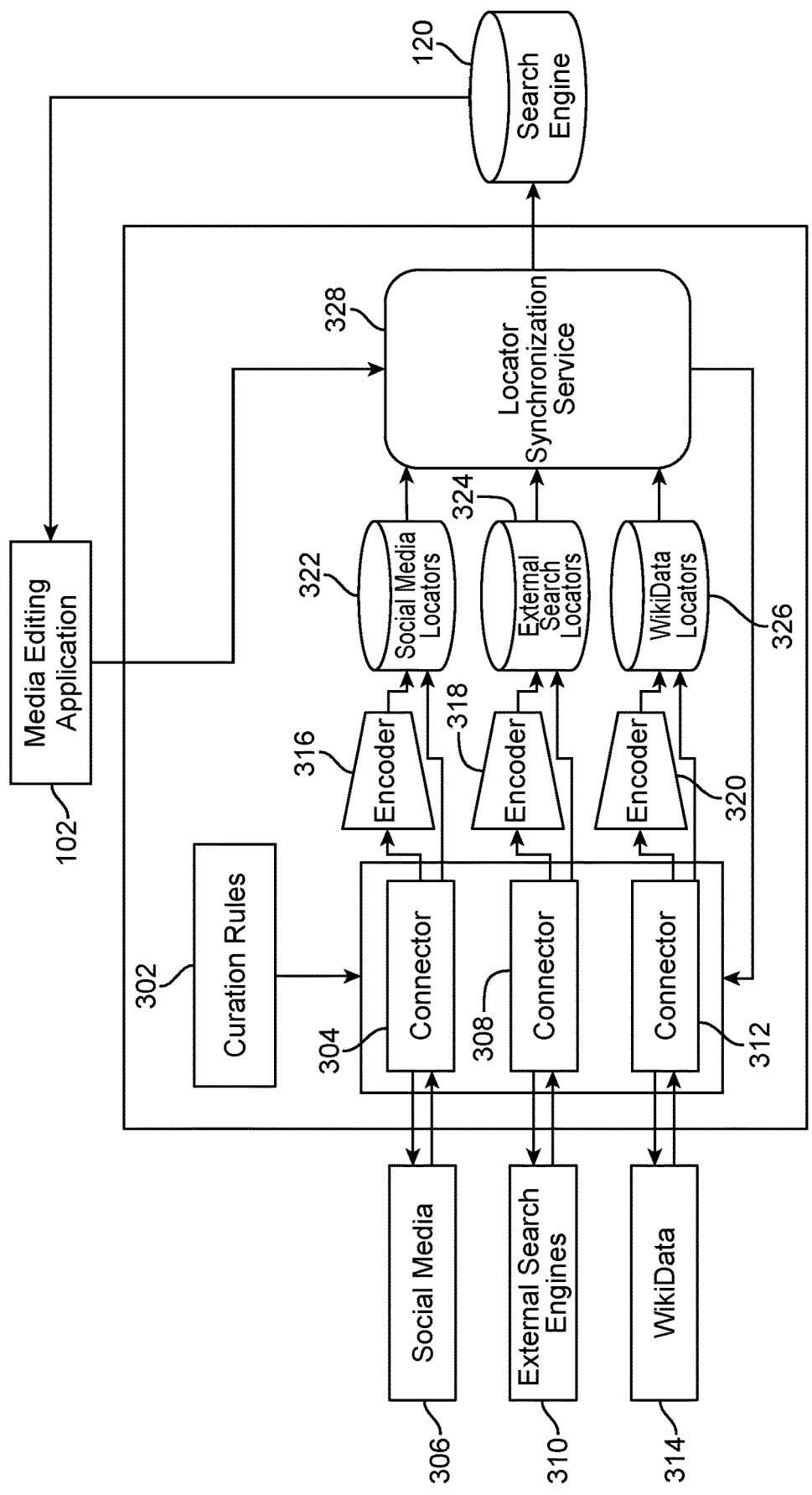
FIG. 3 is a high-level block diagram showing the use of dynamic external sources as sources of material to be searched for supporting material for a media project.

In various use cases, editors need to work with source material that does not have a long lifecycle. For example, as an event is unfolding, a news editor writing a story may wish to access content that appears dynamically as events unfold. One source of such dynamic material are texts and associated audio and video content appearing on social media outlets. Unlike static material that can be retrieved and encoded a single time, dynamic material requires special handling to allow it to be searched and used as supporting material for a media project. Referring to the high-level block diagram of FIG. 3, such a system supplements source material 116 and encoder 118 of FIG. 1 with connectors and databases specific to each dynamic source. To ensure relevance to the context of the media project, the system uses curation rules 302 to locate material in a dynamic data source. The curation rules are based on hints and other information associated with the media project by the media editing application and managed by the media editing application. The curation rules are received by connectors 304, 308, and 312, each adapted to a dynamic data source, illustrated by social media 306, external search engines 310, and WikiData databases 314 respectively. The connectors retrieve relevant content in accordance with the curation rules and a locator for each item retrieved from the dynamic data source. As used herein, a locator is synonymous with an index for a content item. Since the sources are fast-changing, the system does not retrieve the full content as it appears in the dynamic data source, instead extracting just enough material to enable semantic embeddings to be created for it. For example, the retrieved material may comprise descriptive metadata, a summary, or a thumbnail image. Encoders 316, 318, 320 generate embeddings for the material retrieved by the connectors. As described above, the encoders may be multimodal so as to be able to handle multimodal content retrieved from the dynamic data sources. The embeddings together with locators corresponding to each content item are stored in connector-specific databases 322,

324, and 326. The locators serve as indices to the dynamic source material for which embeddings have been created. The locators and embeddings are passed to search engine 120 via index synchronization service 328. The connectors monitor changes to the original data using an interface (API) exposed by the dynamic data sources, thus implementing lifecycle management of the dynamic data. When changes occur, the connector is able to trigger appropriate deletion or update of the embeddings and locators in its connector-specific database. This in turn triggers a refresh of the embeddings and locators stored in the search engine. The search results are passed to media editing application 102. When the search results include material from one of the dynamic data sources, the application calls locator synchronization service 328, which resolves the locator to the connectors corresponding to the dynamic data source from which the material was retrieved. The identified connector then retrieves the requested material from the dynamic data source.

Text and media sampled from various modalities are encoded to the same embedding space, which allows the unified searching for the closest vector matches across all the encoded modalities. While sources of text can be provided directly to the encoder without conversion, other modalities may require conversion so as to conform to the form of data used when training the encoder models, as discussed above. With external data sources for which a connector is deployed as described above, the converter may be part of the connector software, and may be implemented as software plug-in modules.

Source material 116 is provided to machine-learning-based (e.g., neural-network-based) encoder 118 that converts each item of source material into a vector in the same embedding space used by encoder 114. For purely textual source material, an encoder similar to encoder 114 may be used. When the source material includes other modalities, such as still imagery, graphics, video or audio, encoder 118 encodes all such media into a unified embedding space. A separate neural network may be used to encode each modality or a single multi-modal encoder, such as CLIP, may be used. For example, to encode an image, encoder 118 inputs a digital image, such as a 240×240-pixel RGB image, and outputs an embedding consisting of 512 floating-point numbers. This defines a vector for the image in a 512-dimensional embedding space. The closer this vector is to vectors corresponding to other items, such as the embedding of the LLM output 112, the more semantically related it is to the LLM output.

Search results 122 are provided to media editing application 102 for use by the editor of the media project. In various implementations, the results are used to populate one or more bins within the application. In an exemplary user interface, a search window is provided by the media editing application into which the user types a search query, with results appearing in the same window or adjacent to it. In an alternative interface, a suggestions box is presented on the screen. As the user works on the project, the suggestions box automatically updates with suggested supporting media for the editor.

Figure 4:
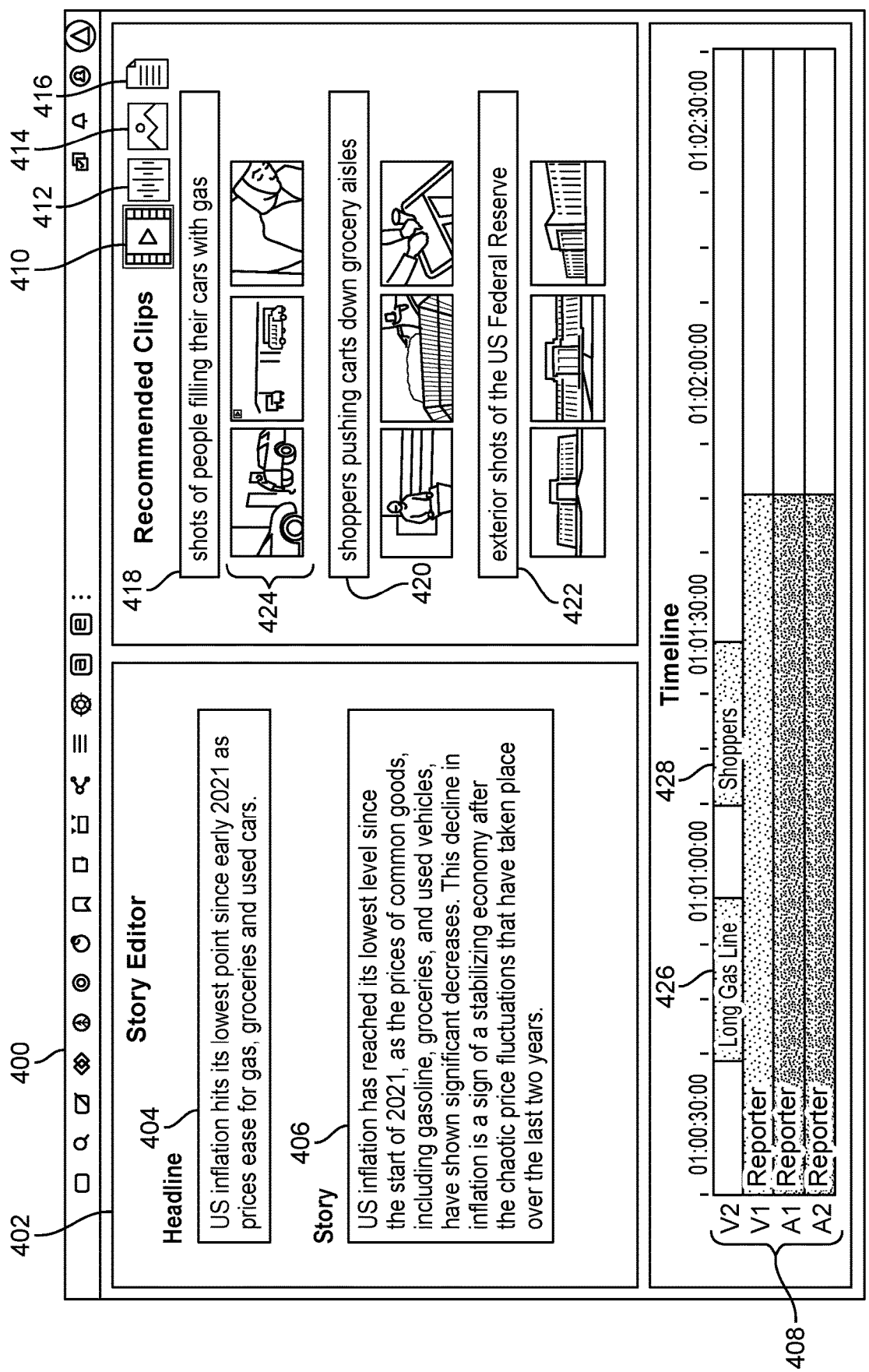
FIG. 4 is a diagrammatic screenshot of an exemplary user interface for a media editing application that enables a user to use a large language model together with machine-learning semantic encoders to find supporting material for media project.

FIG. 4 is a diagrammatic screenshot 400 of an exemplary user interface for media editing application 102 that enables a user to use the LLM together with machine-learning semantic encoders to find supporting material for media project 104. Story editor window 402 shows headline 404 and news story 406. Timeline 408 with video tracks V1 and V2 and audio tracks A1 and A2 indicate the material that the editor has placed into the media project. Thus, V1 contains a video clip of a news reporter, with corresponding audio (two channels) appearing in tracks A1 and A2. The prompt (not shown) requesting types of supporting material has been issued to the LLM. The contextual component of the prompt includes a selected portion of the primary content, which may include the news story shown in story window 406, as well optional grounding material. LLM output is shown in boxes 418, 420, and 422, each of which may be edited by the user.

Figure 5:
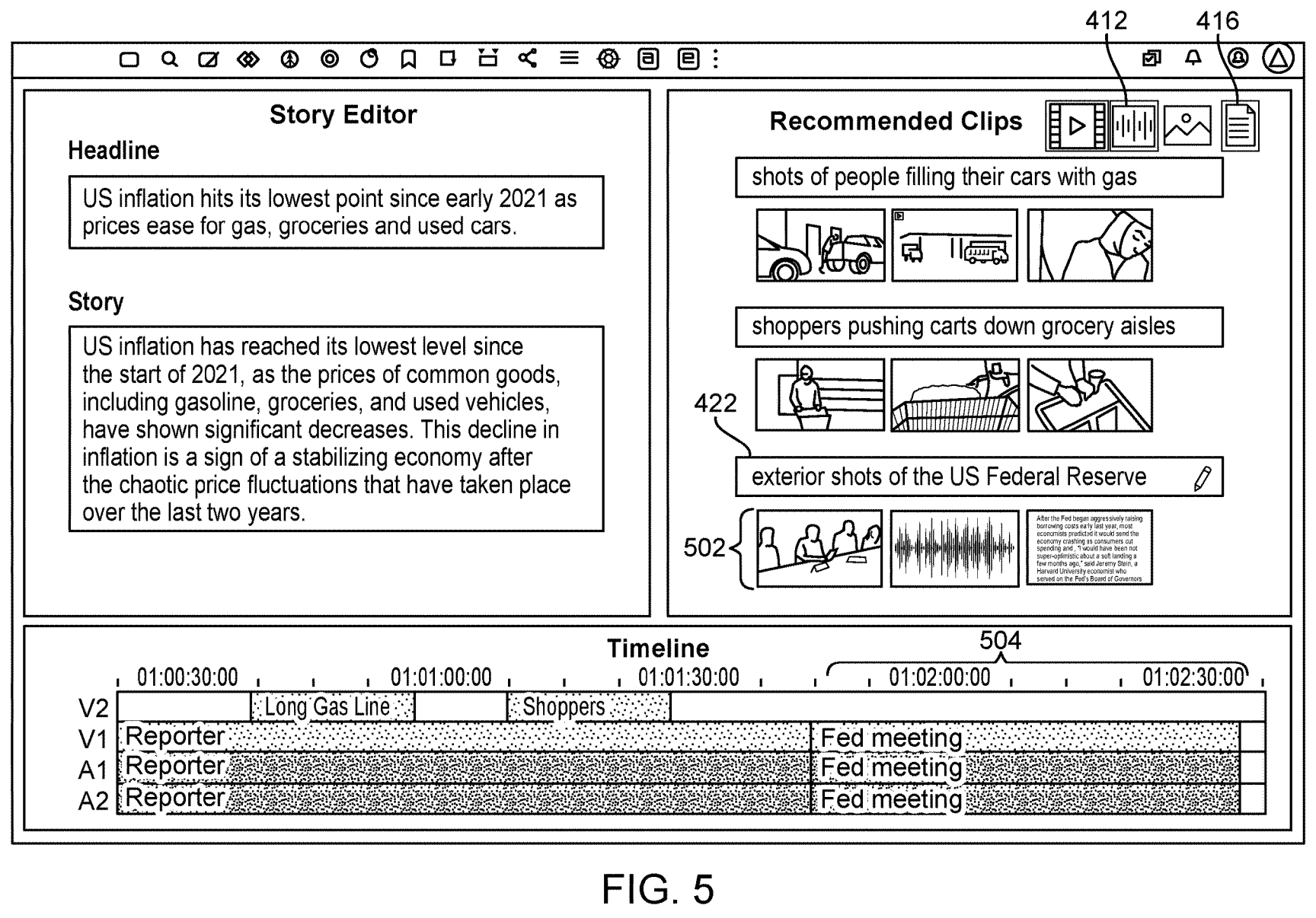

Referring again to FIG. 4, diagrammatic screen shot 400 of the media editing application user interface includes buttons 410, 412, 414, and 416, which enable the user to specify the desired supporting material modalities, i.e., video, audio, still imagery, and text respectively. The figure shows a user selection of the video modality (button 410 highlighted). LLM output 112 of suggested types of supporting material is shown in boxes 418, 420, and 422. Below each of these boxes, the system displays thumbnails of the corresponding highest-ranking (i.e., "closest" to the search vector in embedding space) items from search results 122. For example, thumbnails 424 represent three search results for video clips of people filling their cars with gas. The user may select one of the displayed items and place them in the timeline as shown with clips 426 and 428. The user may edit the output of the LLM as indicated in FIG. 5, which shows the same user interface window as FIG. 4 but with an edit performed to the result previously shown in box 422, replacing "exterior shots of the US Federal Reserve" with "meeting of the Federal Reserve." The screenshot also shows user selection of two additional modalities, i.e., audio (button 412) and text (button 416). Search results 502 now include a video clip of the Federal Reserve meeting (left), an audio clip of the meeting (center), and text, e.g., a press release (right). The user has inserted a selection of the modified search results into the media project timeline, i.e., video and audio clips 504.

The search for suitable supporting material is performed using search engine 120 that looks for proximity in embedding space between vectors corresponding to the LLM output 112 (i.e., the semantically-broadened search query) and vectors corresponding to the items within the corpus of source material. Items within the corpus of source material that have vectors in text embedding space that are "close" to the vector corresponding to LLM output 112 are likely to be semantically similar, and hence relevant to the project at hand, and may be included within search results 122. An example of search engine 120 is Elasticsearch®, a product of Elasticsearch B.V. of Mountain View, California. The search engine identifies the degree of proximity of each of the embedding space vectors corresponding to items in source material 116 and the vector corresponding to the search query based on LLM output 112. Various implementations use Pythagorean distance metrics and cosine similarities as the measure of embedding space distances. The use of the cosine similarity metric is described in Salton, G. and Buckley, C., "Term-weighting Approaches in Automatic Text Retrieval," DOI: 10.1016/0306-4573 (88) 90021-0, January 1988, which is wholly incorporated herein by reference. In some implementations distances are only determined for vectors that fall within a certain range of the search query vector so as to reduce the computational load. Some methods for similarity searching in semantic vector spaces are described in Rygl, J. et al., DOI: 10.18653/v1/W17-2611, 3 Aug. 2017, which is wholly incorporated herein by reference.

Search results 122 include a semantically appropriate set of supporting materials responsive to the request, grounding material, and contextual material of prompt 108. Returning to the example of a news story on inflation, the search results might include footage of financial district streets, stock markets and their associated chart, and consumer spending. The media modalities include those specified in the request, provided the requested modalities are present in the source material.

The criteria for inclusion within search results 122 may include one or more of a numerical limit of the number of returned items and a maximum distance in embedding space between a vector of a source material item and one of the query vectors. When cross-modal searches are performed, i.e., when the mode of the search query (i.e., text) differs from that of an item of searched source material, the criteria for similarity are adjusted so as to include lower degrees of proximity in embedding space. For example, text to image searches with a cosine similarity score of 35% or more correspond to a "match" and are included in search results. For text to text searches a cosine similarity score of 90% or better is typically required for inclusion within the search results. The number of search results returned to the editor is usually determined by a default or explicit user setting within the media editing application. The number of results may also be determined by constraints of the user interface, e.g., the size of a window for showing recommended clips as illustrated on the right hand side of FIGS. 4 and 5.

In various use cases it is desirable to use a language model that is smaller than the large language models discussed above. LLMs such as GPT-3 and GPT-4 are very large, the latter having about 175 billion parameters (neurons). As a result, they only run on remote servers with high-end hardware, and the process of training them consumes large amounts of power. In some circumstances it may be desirable to avoid using the Internet, e.g., when there are data security concerns or when Internet access is limited or absent. In such cases, a small language model (SLM) may be deployed since these can be run on the premises of the user and operate more economically than an LLM. Examples of SLMs include BLOOM and GPT-J, which have versions with 7 billion and 6 billion parameters respectively. In order for such SLMs to be effective in finding supporting documents for a media project, the model is fine-tuned using a training dataset generated by an LLM. In one implementation, 10,000 queries and response pairs are used to train the SLM. The queries are selected for their generic similarity to the task the SLM is to be given (e.g., finding types of support material for news stories), though they do not need to be subject specific (e.g., about inflation). More specifically, for this application, 10,000 [news story]-[types of supporting document] pairs are generated by the LLM using prompts consisting of one of the news stories (as the contextual material) and a request for types of supporting document. In order to replicate the way in which the SLM will be used, grounding material may also be supplied as part of the training data set. The use of this "student-teacher" model with the LLM providing training data for the SLM can result in a trained SLM that provides results that are 90-93% as accurate as those of a full-size language model. Accuracy is assessed using a test dataset that has was withheld from the SLM during training.

Figure 6:
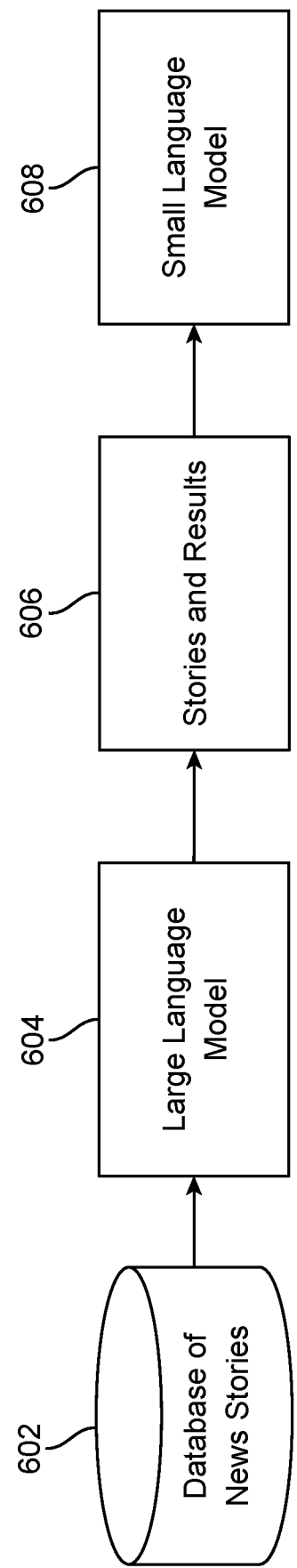
FIG. 6 is a high-level block diagram illustrating the use of a large language model to provide a dataset for task-oriented training of a small language model.

The use of a small language model is illustrated in FIG. 6. Database of news stories 602 is made available to LLM 604. A set of queries to find supporting documents for some or all of the news stories is run through the LLM. The news stories and their corresponding results (i.e., types of supporting documents) are assembled as story-result pairs 606. This is then used as a fine-tuning training data set for SLM 608. To help the SLM perform well on multiple tasks, the training data set can be generated for multiple tasks, i.e., the news stories can be input multiple times to the LLM but with different requests. Examples of such requests are: "List types of B-roll footage for a news story with the headline <headline_text>," "List types of press releases for a news story with the headline <headline_text>," "List types of tweets for a news story with the headline <headline_text>," and "List types of reference documents for a news story with the headline <headline_text>. After such cross-task training, the SLM performs better with a related but new task, such as "List types of background audio for a news story with headline <headline_text>.

In various use cases, the search for supporting material involves presenting multiple queries to the LLM. In a first query, the model is used to output a set of types of supporting material. As discussed above, this serves to broaden the search beyond the traditional results that would be obtained without the use of an LLM, e.g., by matching text within a source document with text in a search query. The suggested set of supporting material types is then used as input in a second query to the LLM, this time requesting actual instances of documents of the suggested type. More than two passes through the LLM may be used to further define the search for supporting material. For example, to further broaden the search, in a second query, the LLM is requested to expand on a list of types of documents returned by a first query. The request may include specific dimensions, such as subject matter, temporal, or modalities in which the search should be broadened. The results from the second query are then used to request the LLM for specific instances of source material.

Multiple passes through the LLM may also occur when the editor selects for inclusion within the media project an item from the search results. This item may then become a primary material item that is provided as context to the LLM in a new request for supporting material types.

Figure 7:
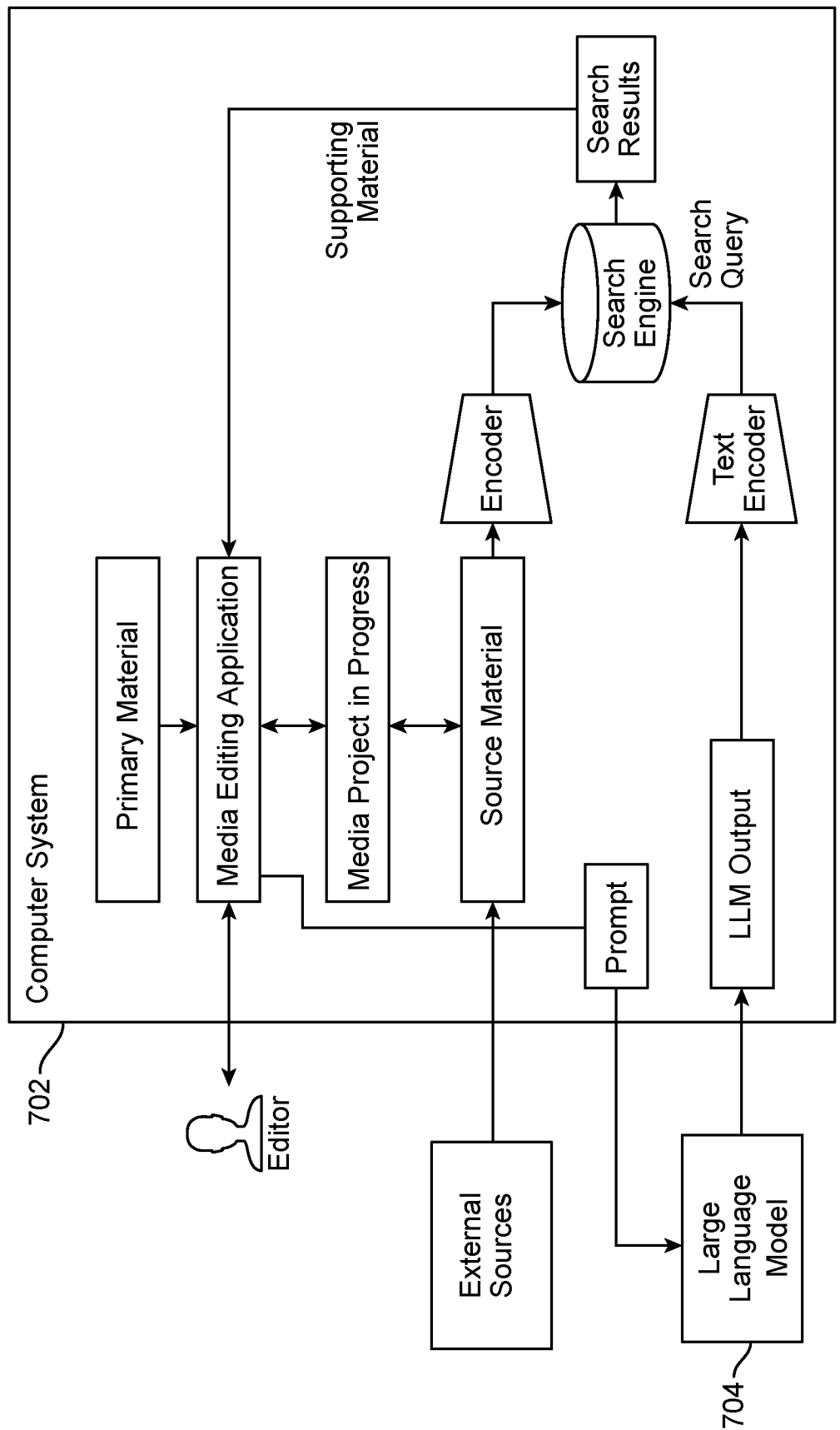
FIG. 7 is a high-level bock diagram of a system for using a large language model to search for supporting material for a media project.

FIG. 7 is a high-level bock diagram of a system for semantic searching for supporting documents. All the elements shown in FIG. 1 may be implemented on host 702 local to the editor, except for LLM 704, which is implemented remotely on a large system or in the cloud and accessed remotely, e.g., via the internet. When the LLM is replaced by a fine-tuned SLM, as discussed above, all the functions, including the SLM, may be implemented on a local host. Local host 702 may be a personal computer or a workstation, or a mobile device such as tablet or smartphone.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of locating material in support of a media project, the method comprising:
    directing a prompt to a large language model (LLM), wherein the prompt includes:
        one or more items of content pertaining to the media project; and
        a request to provide a list of types of material that support the media project;
    receiving output from the LLM, the LLM output comprising a list of types of material that support the media project;
    inputting the LLM output to a first machine-learning-based encoder to generate a first set of embeddings that include, for each type of supporting material specified in the LLM output, a corresponding vector in an embedding space;
    providing a body of source material to a second machine-learning-based encoder to generate a second set of embeddings comprising, for each item of source material in the body of source material, a corresponding vector in the embedding space;
    using a search engine to identify a plurality of vectors of the second set of embeddings having a greatest degree of similarity in the embedding space with at least one vector of the first set of embeddings; and
    outputting from the search engine a plurality of items of the source material, each item of the plurality of items of the source material corresponding to the one of the identified plurality of vectors of the second set of embeddings.

2. The method of claim 1, wherein the content pertaining to the media project has been incorporated into the media project.

3. The method of claim 1, wherein the prompt includes grounding material comprising material that was not included within data used to train the LLM.

4. The method of claim 1, wherein the list of types of material that support the media project output by the LLM includes a plurality of media modalities.

5. The method of claim 1, wherein the one or more items of content pertaining to the media project included within the prompt includes a non-text media modality.

6. The method of claim 1, further comprising:
    enabling a user of a media editing system used to create the media project to edit the LLM output; and
    inputting to the first machine-learning-based encoder LLM output edited by the user.

7. The method of claim 1, wherein the body of source material includes a plurality of media modalities.

8. The method of claim 1, wherein the second machine-learning-based encoder is able to encode a plurality of media modalities into a common embedding space.

9. The method of claim 1, wherein the body of source material includes material obtained from sources external to a media editing system used to create the media project.

10. The method of claim 9, wherein the sources external to the media editing system are dynamic.

11. The method of claim 10, wherein the dynamic sources include at least one of a social media feed, external search engines, and WikiData.

12. The method of claim 9, wherein a description of a content item in an external source is retrieved and encoded to generate a corresponding vector in the embedding space, and, when the content item is requested for use with the media project, a locator associated with the vector is used to retrieve the content item from the external source.

13. The method of claim 9, wherein the material obtained from sources external to the media editing system is curated and stored in a storage location that is local to the media editing system, the curation including selection of material based on at least one of a date of release of the material, a current presence of the material in an external source, and a size of the material.

14. The method of claim 1, wherein the degree of similarity in the embedding space is one of a cosine similarity metric and a Pythagorean distance metric.

15. The method of claim 1, wherein the prompt is automatically directed to the large language model when a location of a position indicator within a media editing application used to create the media project is changed.

16. The method of claim 1, further comprising displaying within a user interface of a media editing application used to create the media project one or more items of the plurality of items of the source material output by the search engine.

17. The method of claim 1, further comprising displaying within a user interface of a media editing application used to create the media project the output of the LLM.

18. The method of claim 1, further directing a second prompt to the LLM, the second prompt including the LLM output and a request to specify actual instances of potential source material items of the types listed in the LLM output.

19. A method of locating material in support of a media project, the method comprising:
   directing a prompt to a small language model (SLM), wherein:
      the SLM has been trained using a data set comprising a plurality of news stories and, for each news story in the plurality of news stories, a corresponding large language model (LLM) output of a list of types of material that would support a media project pertaining to the news story; and
      the prompt includes:
         one or more items of content pertaining to the media project; and
         a request to provide a list of types of material that support the media project;
   receiving output from the SLM, the SLM output comprising a list of types of material that support the media project;
   inputting the SLM output to a first machine-learning-based encoder to generate a first set of embeddings that include, for each type of supporting material specified in the SLM output, a corresponding vector in an embedding space;
   providing a body of source material to a second machine-learning-based encoder to generate a second set of embeddings comprising, for each item of source material in the body of source material, a corresponding vector in the embedding space;
   using a search engine to identify a plurality of vectors of the second set of embeddings having a greatest degree of similarity in the embedding space with at least one vector of the first set of embeddings; and
   outputting from the search engine a plurality of items of the source material, each item of the plurality of items of the source material corresponding to the one of the identified plurality of vectors of the second set of embeddings.

20. The method of claim 19, wherein the SLM and a media editing application used by an editor to edit the media project are hosted on a system local to the editor.

21. A computer program product comprising:
a non-transitory computer-readable medium with computer-readable instructions encoded thereon, wherein the computer-readable instructions, when processed by a processing device, instruct the processing device to perform a method of locating material in support of a media project, the method comprising:
   directing a prompt to a large language model (LLM), wherein the prompt includes:
      one or more items of content pertaining to the media project; and
      a request to provide a list of types of material that support the media project;
   receiving output from the LLM, the LLM output comprising a list of types of material that support the media project;
   inputting the LLM output to a first machine-learning-based encoder to generate a first set of embeddings that include, for each type of supporting material specified in the LLM output, a corresponding vector in an embedding space;
   providing a body of source material to a second machine-learning-based encoder to generate a second set of embeddings comprising, for each item of source material in the body of source material, a corresponding vector in the embedding space;
   using a search engine to identify a plurality of vectors of the second set of embeddings having a greatest degree of similarity in the embedding space with at least one vector of the first set of embeddings; and
   outputting from the search engine a plurality of items of the source material, each item of the plurality of items of the source material corresponding to the one of the identified plurality of vectors of the second set of embeddings.

22. A system comprising:
a memory for storing computer-readable instructions; and
a processor connected to the memory, wherein the processor, when executing the computer-readable instructions, causes the system to perform a method of locating material in support of a media project, the method comprising:
   directing a prompt to a large language model (LLM), wherein the prompt includes:
      one or more items of content pertaining to the media project; and
      a request to provide a list of types of material that support the media project;
   receiving output from the LLM, the LLM output comprising a list of types of material that support the media project;
   inputting the LLM output to a first machine-learning-based encoder to generate a first set of embeddings that include, for each type of supporting material specified in the LLM output, a corresponding vector in an embedding space;
   providing a body of source material to a second machine-learning-based encoder to generate a second set of embeddings comprising, for each item of source material in the body of source material, a corresponding vector in the embedding space;
   using a search engine to identify a plurality of vectors of the second set of embeddings having a greatest degree of similarity in the embedding space with at least one vector of the first set of embeddings; and
   outputting from the search engine a plurality of items of the source material, each item of the plurality of items of the source material corresponding to the one of the identified plurality of vectors of the second set of embeddings.

* * * * *